United States Patent [19]

Nakano et al.

[11] 4,095,969
[45] Jun. 20, 1978

[54] SYSTEM FOR MANUFACTURING CIRCULAR FORMED LAMP TUBES

[75] Inventors: Goro Nakano, Kawasaki; Hidehiko Yoshida, Chigasaki; Yasuo Sakata, Ome, all of Japan

[73] Assignee: Tokyo Shibaura Electric Co., Ltd., Japan

[21] Appl. No.: 719,133

[22] Filed: Aug. 31, 1976

[51] Int. Cl.² .............................................. C03B 23/14
[52] U.S. Cl. ...................................... 65/281; 65/110; 65/271
[58] Field of Search ................... 65/108, 110, 271, 281

[56] References Cited

U.S. PATENT DOCUMENTS

| | | | |
|---|---|---|---|
| 2,494,871 | 1/1950 | Greiner | 65/281 |
| 2,494,872 | 1/1950 | Greiner et al. | 65/110 X |
| 2,494,923 | 1/1950 | Yoder et al. | 65/110 X |
| 3,202,261 | 8/1965 | Pianowski | 198/477 |
| 3,208,600 | 9/1965 | Bignall et al. | 214/1 BB |
| 3,850,106 | 11/1974 | Krivec | 104/27 |

*Primary Examiner*—Arthur D. Kellogg
*Attorney, Agent, or Firm*—Oblon, Fisher, Spivak, McClelland & Maier

[57] ABSTRACT

A system for manufacturing lamp tubes formed in a circular configuration features a plurality of carrier devices attached to a transfer apparatus which links a lamp-tube-softening apparatus, a bending apparatus and an exhaust apparatus, respectively, in an endless or continuous manner. Each carrier device which receives and holds a sealed lamp tube from a supply source or station can thus return to its starting position after completing its passage around the lamp-tube-softening apparatus, the bending apparatus and the exhaust apparatus, respectively.

4 Claims, 8 Drawing Figures

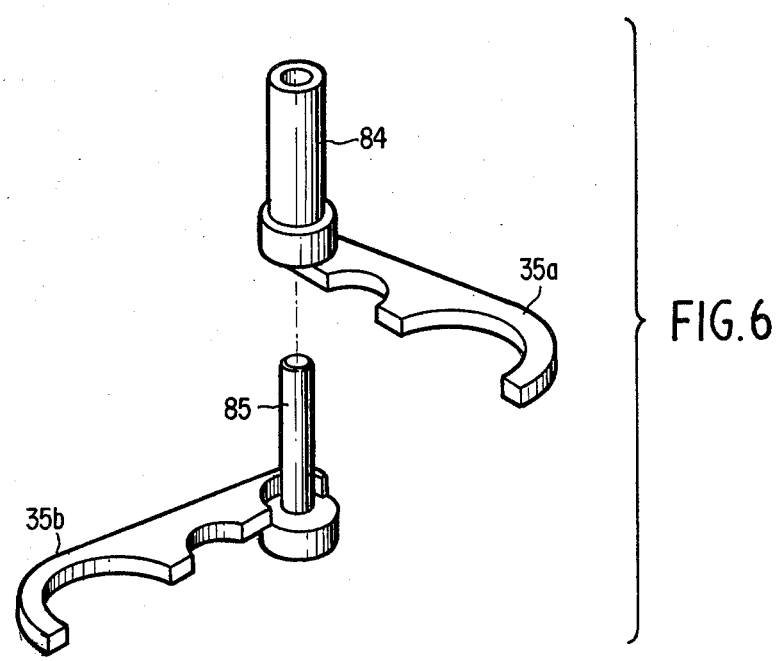
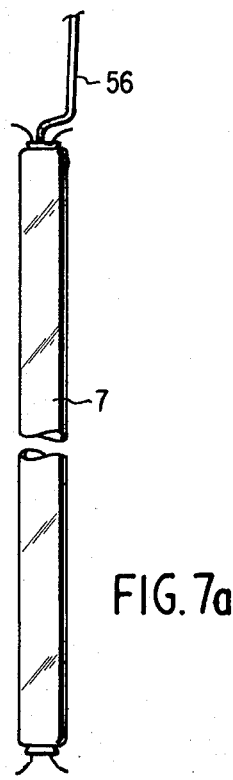
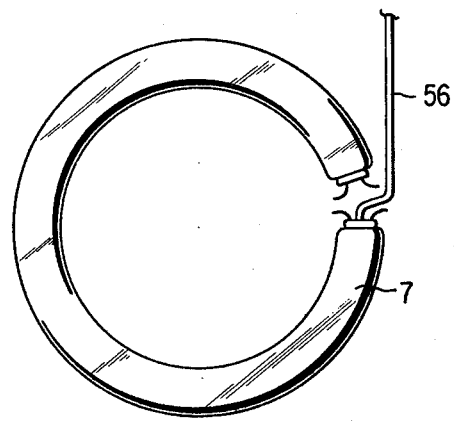
FIG. 6
FIG. 7a  FIG. 7b

SYSTEM FOR MANUFACTURING CIRCULAR FORMED LAMP TUBES

BACKGROUND OF THE INVENTION

1. Field of the Invention

This invention relates generally to a system for manufacturing fluorescent lamp tubes having a circular form, and more particularly to a high speed system using a plurality of carrier devices, each of which returns to its starting position after passing around the various working stations in the manufacturing operation.

2. Description of the Prior Art

In manufacturing fluorescent lamp tubes having a circular form, it is necessary to bend glass lamp tubes having a straight or elongate form into such circular shaped tubes after first performing a tube softening operation thereon. The bending must then be carried out before the lamp tubes are cooled because of the increase of the rigidity thereof that occurs after such cooling takes place. For this reason, the bending working station is located close to the tube softening working station, usually being located on the same turn-table, which is divided into the respective functional parts of the different working stations.

It is also known that after bending the tube into its circular form, about 10 seconds cooling time is required in order to prevent the deformation or breaking thereof.

In the prior art, the bending operation is carried out by a roller, as shown in U.S. Pat. No. 3,215,518, which winds up the straight tube around its periphery to form the circular tube. The circular tube so produced, however, cannot be released immediately from the roller because of the reason described above, that is, because of the cooling time required. Thus, as the roller is occupied by the bended, and now circular, lamp tube, the next consecutive straight lamp tube being fed from the tube softening working station therefore cannot be immediately wound upon the roller for shaping. This means that, after each bending operation, the lamp tube-manufacturing process is interrupted, or must be momentarily stopped, regardless of the actuation of the other operations.

In view of this disadvantage, it is easy to imagine a bending apparatus which provides a large number of rollers for forming a similar large number of circular lamp tubes at the same time. However, such an apparatus tends to give rise to other disadvantages, such as, for example, complexity of the mechanism or very large turn-tables, and an increase of the peripheral velocity, which affects the formation of the lamp tubes, especially when the turn-table begins to rotate or stop.

SUMMARY OF THE INVENTION

Accordingly, one object of this invention is to provide an improved system for manufacturing circular fluorescent lamp tubes from such lamp tubes having a straight form wherein bending operations can be successively carried out on a plurality of lamp tubes without interruption of the manufacturing process for cooling and the like and which enables high speed manufacture in a limited space and continuous operation.

Another object of this invention is to provide an improved system of the character described herein which utilizes a plurality of novel carrier devices for supporting the lamp tubes during the shaping thereof into circular form and wherein each of such carrier devices returns to its starting position after passing through a lamp tube softening apparatus, a bending apparatus and an exhausting apparatus, by linking a transfer apparatus respectively thereto in an endless manner.

A further object of this invention is to provide a novel and improved carrier device for holding a lamp-tube-end and a lamp stem of a fluorescent lamp tube which is being formed into a circular configuration from a straight form and which helps prevent deformation and breaking thereof during such process.

The foregoing and other objects are achieved by the present invention through the provision of a system which provides for the transfer of a plurality of carrier devices of fluorescent lamp tubes between a heating apparatus wherein softening of a straight lamp tube takes place, a bending apparatus wherein the straight tube is shaped into a circular form and is permitted to cool, and an exhausting apparatus wherein mercury dosing of the lamp tubes, tipping off of the exhaust tubes thereof and discharge or delivery of the circular lamp tubes are accomplished. The transfers of these devices provides an endless path therefor and thus provides for a continuous operation. The carrier devices themselves further provide, in addition to means for supporting the lamp tubes during their passage through the various apparatus or operational phases of the circular formation thereof, a connecting means including a duct portion and a lamp stem holder for permitting air-tight detachable engagement of exhaust tubes of the lamps with blowing heads in the different apparatus for introducing gas thereinto or exhausting such lamp tubes.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference numerals designate like or corresponding parts throughout the several views, and in which:

FIG. 6 illustrate a lamp tube holder according to the present invention; and

FIGS. 7(a) and 7(b) illustrate lamp tubes having straight and circular forms, respectively.

DESCRIPTION OF A PREFERRED EMBODIMENT

Figure 1:
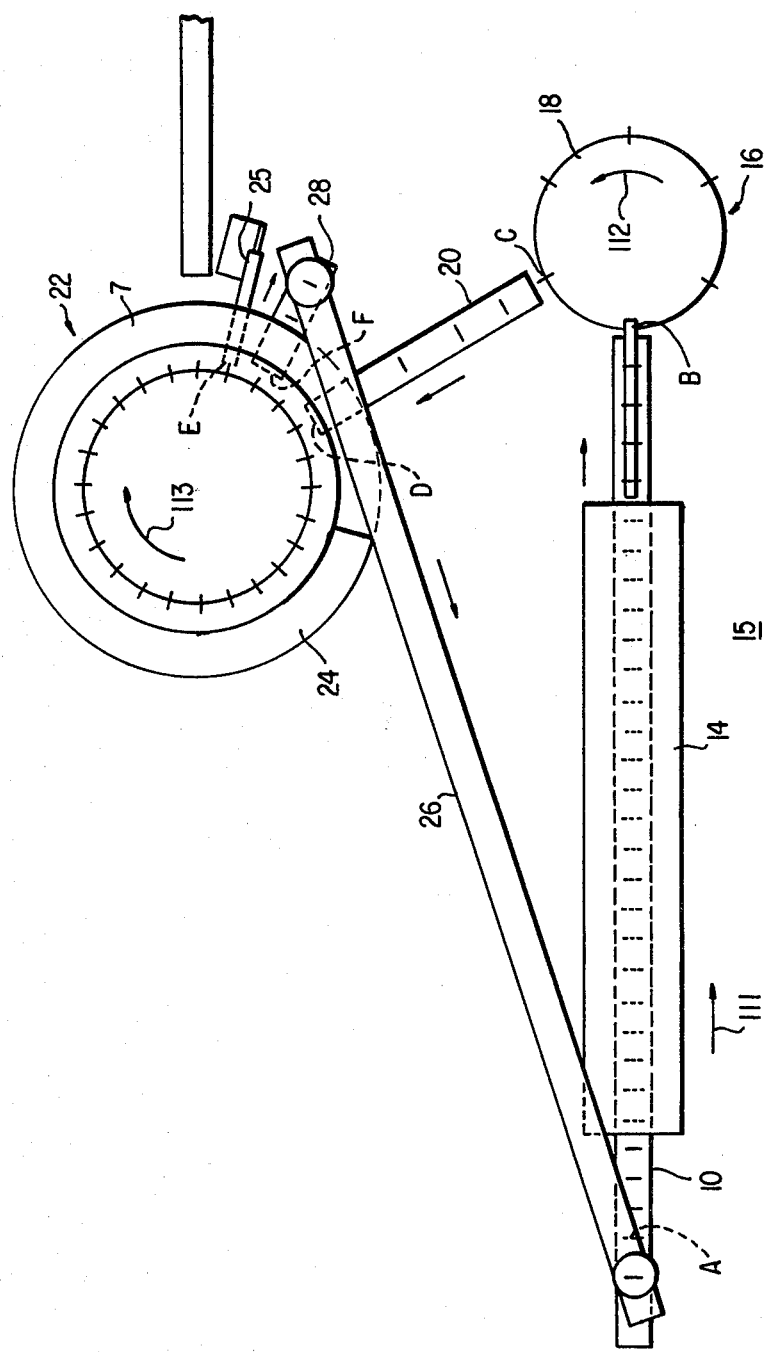
FIG. 1 is a schematic view of a preferred embodiment of the present invention.

Referring now to the drawings, and particularly to FIG. 1 thereof, a specific embodiment of a system for manufacturing lamp tubes having a circular form, generally designated by the numeral 15, is shown to include a first transfer apparatus 10, which feeds straight lamp tubes of the form shown in FIG. 7(a), being distributed from a supply channel, not shown, at a position A along the direction of the arrow 111, and a lamp tube softening apparatus 14, such as an electrical furnace, in which the lamp tubes are uniformly heated.

The manufacturing system 15 further includes a bending apparaus 16 having a turn-table 18 on which six bending devices, not specifically shown, being equi-radially spaced apart, are mounted. The bending devices are winding-up type rollers, such as indicated in U.S. Pat. No. 3,215,518, which are movable upwardly and downwardly during their operation. At a position B, the first transfer apparatus 10 is linked to the bending apparatus 16 to enable the lamp tubes softened in the furnace 14 to be sent or dispatched therefrom to the bending apparatus. Then while the turn-table 18, which is rotated intermittently in the direction indicated by the arrow 112, or in a counterclockwise direction, as viewed in FIG. 1, by a conventional drive mechanism, not shown, moves a bending device thereon from the position B to the position C, the tube shaping is performed, so that the lamp tube takes on the circular configuration shown in FIG. 7(b).

A second transfer apparatus 20 is linked to the bending apparatus 16 at the position C thereof to receive the circular formed lamp tubes, which then feeds them toward an exhausting apparatus 22 at the end D of the second transfer apparatus 20. A turn-table 24 of the exhausting apparatus 22, which provides a plurality of exhaust heads, not shown, including mercury dosing means and tipping-off means, not shown, rotates intermittently along the arrow 113 in the direction indicated thereby, or in a clockwise direction, as viewed in FIG. 1. Moving the lamp tube along the arrow 113 to a position E, the lamp tube can complete its transformation into a fluorescent lamp tube having a circular form, and at the position E, the tube is delivered to a delivering means 25. A third transfer apparatus 26 is connected to the first transfer apparatus 10 through a returning transfer apparatus 28, which is linked to the exhausting apparatus 24 at a position F.

In the system mentioned above, there is provided a plurality of carrier devices 30, for carrying the lamp tube to be formed into a circular shape, each of which travels through the various transfer apparatus 10, 20, 26 and 28, and is detachably connected to the bending apparatus 16 and the exhausting apparatus 22 during the course of such travel.

The carrier device 30, specifically illustrated in FIGS. 2–6, provides a first chuck 34, having a pair of pincer-shaped holders 35a, 35b, for supporting one end of the straight lamp tube being vertically distributed from the supply source at the position A in FIG. 1, and a second chuck 36, having a pair of pincer-shaped holders 39a, 39b, for supporting the other lamp tube end after completion of the circular forming thereof in the bending apparatus 16.

Figure 2:
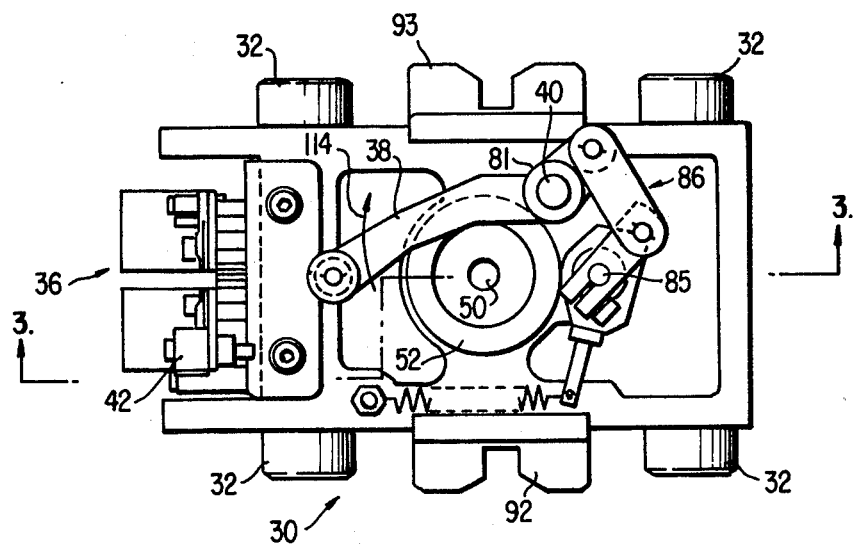
FIG. 2 illustrates a plan view of a carrier device used in the preferred embodiment shown in FIG. 1.
Figure 5:
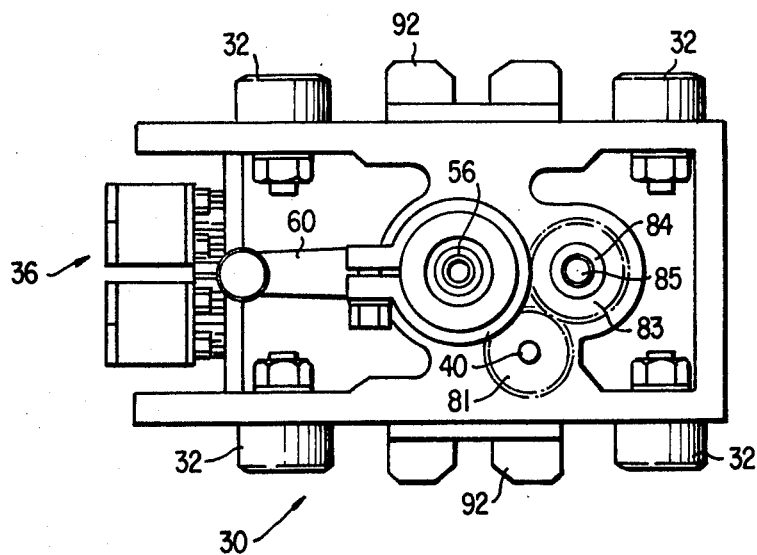
FIG. 5 illustrates a partly sectional bottom view of the carrier device, taken along the line 5—5 of FIG. 3.

The chuck 34, which is ordinarily closed, can be opened in association with the rotation of a first lever 38 in the direction indicated by the arrow 114, as best shown in FIG. 2, by engaging a pushing means, such as an air cylinder head, not shown, disposed at the positions A and E of the first transfer apparatus 10 and the exhausting apparatus 22, respectively. The first lever 38 is pivotally mounted about a pin 40 on the carrier device 30.

Figure 3:
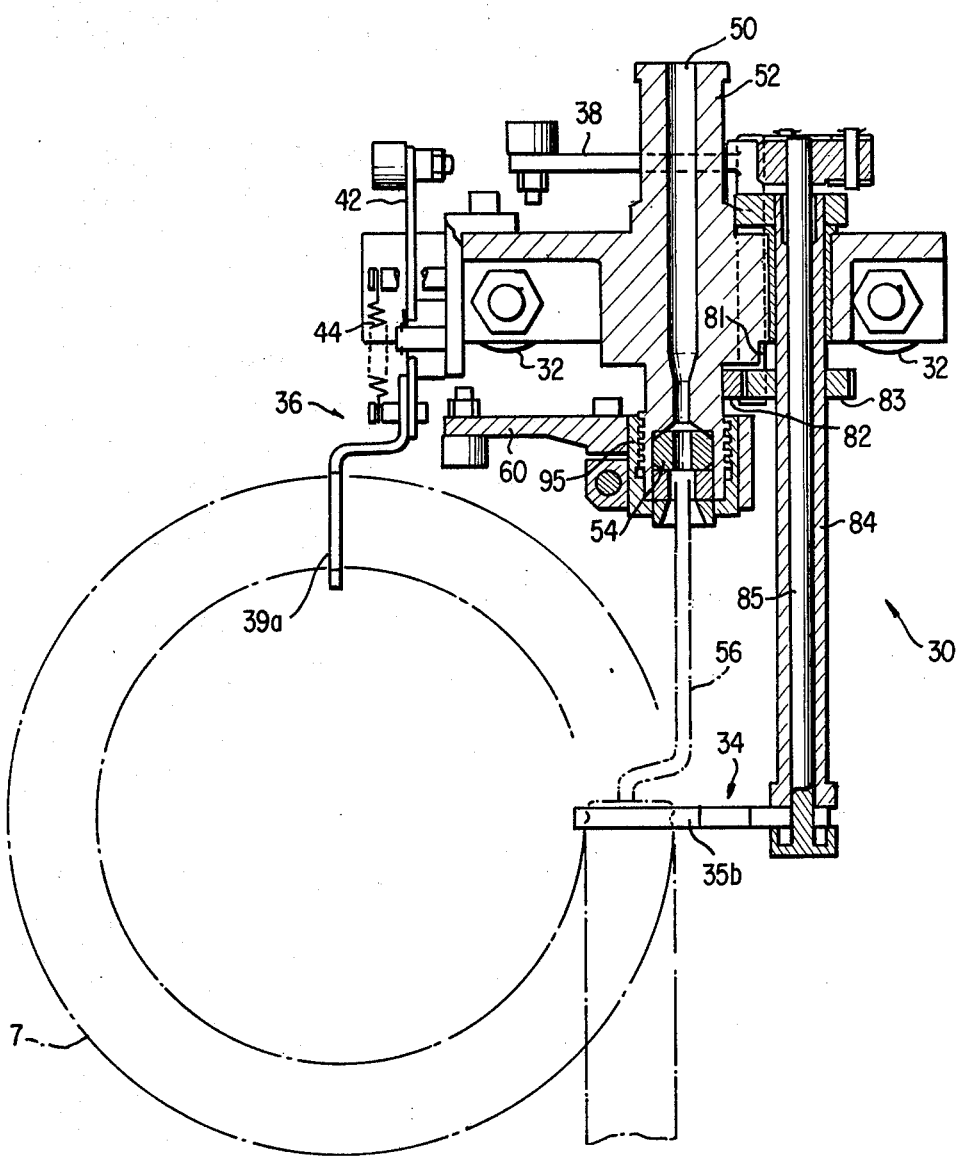
FIG. 3 illustrates a sectional view of the carrier device taken along the line 3—3 of FIG. 2 and looking in the direction of the arrows thereof.

A pin-sleeve 81 around the pin 40 has a gear 82 fixed at one end thereto, shown in FIG. 3, which engages a gear 83 of a pipe portion 84, being disposed in parallel relation to the pin-sleeve 81. A shaft 85, which is inserted within the pipe portion 84, can be rotated about its longitudinal axis by a link-mechanism 86. At an end of the pipe portion 84, the lower end as shown in FIG. 3, the pincer-shaped holder 35a is mounted thereon. The pincer-shaped holder 35b is mounted at the lower end of the shaft 85, which extends slightly below the pipe portion 84 within which it is disposed.

Figure 4:
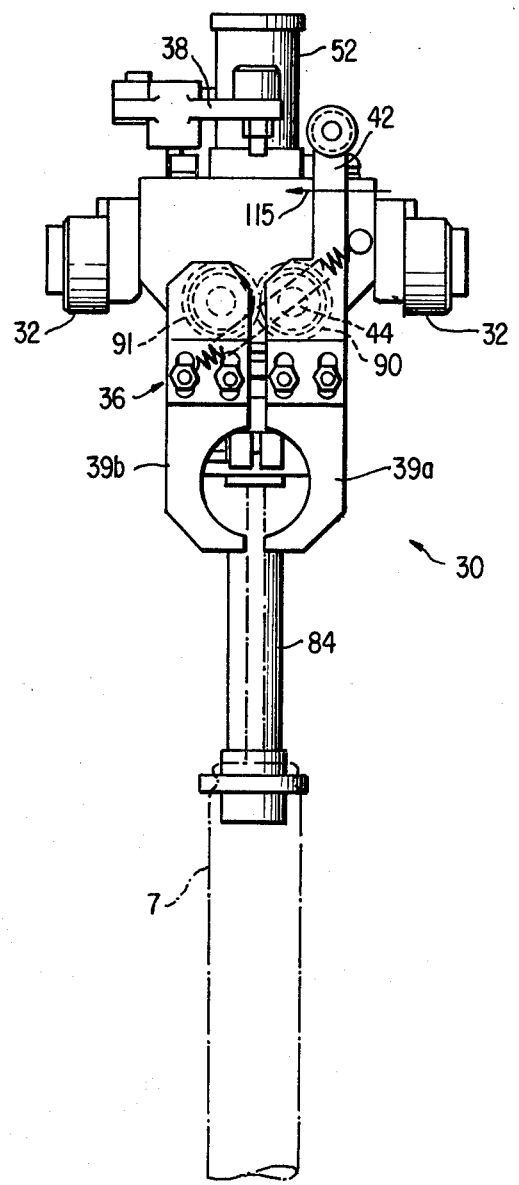
FIG. 4 illustrates a front view of the carrier device shown in FIGS. 2 and 3.

The opening operation of the other chuck 36, which is ordinarily closed, is carried out in association with the rotation of a second lever 42 in the direction indicated by the arrow 115 in FIG. 4 by engagement thereof with a pushing means, such as an air cylinder, not shown, disposed at the positions C and E of the bending apparatus 16 and the exhausting apparatus 22, respectively. The second lever 42 is pivotally mounted on one end of the pincer-shaped holder 39a about a pin 44 which carries a gear 90 which in turn engages a gear 91 of the other pincer-shaped holder 39b. Thus, by the movement of the second lever 42, the pincer-shaped holders 39a and 39b are opened.

The carrier device 30 further comprises a central duct 50 of a connecting device 52 having a packing 54 by which an exhaust tube 56 of the lamp tube extending upward from between the pincers 35a, 35b, as shown in FIG. 3, is held air-tightly. The packing 54 is ordinarily compressed upwardly by a screw portion 95 and only can be relaxed in relation with the rotation of a pushing lever 60 through the engagement thereof with a means, not shown, at the positions A and E of the first transfer apparatus 10 and the exhausting apparatus 22, respectively. An end of the duct 50 may be connected to a first blowing head, not shown, mounted on the tube softening apparatus 14 for preventing a fluorescent coating and electrode elements from oxidation by introducing a gas, such as nitrogen, therefrom, and a second blowing head, not shown, mounted on the bending apparatus 16, for preventing the lamp tube from deformation or breaking, or for permitting good lamp shaping, by introducing a gas, such as nitrogen, therefrom. The exhaust head on the exhausting apparatus 22 also may be connected to the end of the duct 50 of the connecting device 52.

The carrier device 30 described above further provides wings 92, 93 which detachably engage a feeding means, not shown, disposed parallel to the transfer apparatuses 10, 20, 26, and 28. In feeding the carrier devices 30, rollers 32 thereof move on rails, not shown, of the transfer apparatuses 10, 20, 26, and 28 to cooperate the feeding operation with the feeding means.

The operation of the system described herein is as follows. Starting at the instance in which a carrier device 30 is moved to the position A, the first lever 38 and the pushing lever 60 are rotated by the pushing means therefor, whereupon a lamp tube 7 may be received in the then open first chuck 34 and the exhaust tube 56 may be inserted into the duct 50 through the then unrelaxed packing 54. As the carrier device 30 moves in the direction indicated by the arrow 111, as seen in FIG. 1, engagement of the pushing means with the first lever 38 and the pushing lever 60 are released, whereby the pincers 35a, 35b return to their usual closed position in order to hold the tube end and the packing 54 is again compressed to hold the exhaust tube 56 in accordance with the rotation and upward movement of the screw portion 95 by the pushing lever 60.

During the lamp tube softening operation, nitrogen gas from the blowing device attached to the end of the duct 50 on the carrier device 30 is introduced into the lamp tube through the exhaust tube portion 56 thereof.

The softened lamp tube held by the carrier device 30 is then sent to the bending apparatus 16 and is received by the roller thereof at the position B. The roller, which can move upwardly, winds up the lamp tube around its periphery and forms it into a circular shaped tube. The circular formed product wound on the periphery of the roller is still held by the chuck 34 and the packing 54, and the product can be sent to the other working stations by rotation of the turn table 18 while the lamp tube is cooling. Accordingly, there is no need to interrupt the bending operation since the roller occupied by the circular formed product at the position B may be replaced by a vacant roller simply upon the rotation of the turn table 18. Hence, the roller which releases the circular formed and cooled lamp tube at the position C, and thus being vacant, moves to the position B for receiving the lamp tube consecutively being fed to the bending apparatus 16. The lamp tube released from the roller at the position C is sent to the exhausting apparatus 22 through the second transfer apparatus 20, and during the rotation indicated by the arrow 113, the exhausting operation, the mercury dosage operation and the tipping-off operation are carried out.

At the position E, the lamp tube, which is released from the carrier device 30 by engagement with the pushing means, not shown, of the exhausting apparatus 22, is delivered to the delivering means 25 as a circular formed fluorescent lamp tube, while the vacant carrier device 30 moves to the position A of the first transfer apparatus 10, passing through the returning transfer apparatus 28.

Obviously, a conveyor or chain or other suitable type mechanism may be used for feeding the carrier device.

As mentioned above, this invention provides a plurality of carrier devices, each of which returns to its starting position after passing around the tube softening apparatus, the bending apparatus and the exhausting apparatus by linking the transfer apparatuses, respectively, in an endless manner, whereby the bending operations can be carried out successively, and a high speed manufacturing system can be obtained.

Further, this invention provides a carrier device which holds the lamp tube during the manufacturing operation, so that lamp tube deformation or breaking, occurring from handling or transferring lamp tubes, can be avoided.

According to this invention, the working places or stations are linked by the various transfer apparatus in an endless manner, so that the arrangement of the working stations is less limited, or are easily changeable for working convenience.

Obviously, many other modifications and variations of this invention are possible in light of these teachings. It is therefore to be understood that within the scope of the appended claims, the present invention may be practiced otherwise than as specifically described herein.

What is claimed as new and desired to be secured by Letters Patent of the United States is:

1. In a system for manufacturing fluorescent lamp tubes having a circular form from such lamp tubes having a straight form which includes a conveyor system provided with rail members interconnecting a heating station for softening said straight form lamp tubes, a bending station for softening said softened straight form lamp tubes into a circular form and an exhausting station having located therein a plurality of heads for performing operations of exhausting and introducing gas and tipping off an exhaust tube of said lamp tubes, the improvement comprising:

a carrier device for supporting said lamp tubes at each of said stations wherein said carrier device comprises roller members supporting said carrier device on said rail members, lamp-tube-holder means having a pair of holders for gripping said lamp tubes, and means for actuating said holders into a gripping position.

2. A system for manufacturing circular fluorescent lamp tubes according to claim 1, wherein said carrier device further comprises a connecting means, having provided therein a duct portion and a lamp holder for detachably engaging said heads, said lamp holder gripping said lamp while said exhaust tube is inserted into said duct portion.

3. A system for manufacturing circular fluorescent lamp tubes according to claim 2, wherein said connecting means includes packing means having an aperture for air-tightly gripping said exhaust tube which is inserted into said duct portion through said aperture and means for compressing said packing means to provide said air-tight grip.

4. A system for manufacturing circular fluorescent lamp tubes according to claim 3, wherein blow heads for introducing gas through said duct portion of said connecting means to the inside of said lamp tubes are provided in each of said heating apparatus, said bending apparatus and said exhausting apparatus.

* * * * *